(12) United States Patent
Kogure

(10) Patent No.: US 11,815,691 B2
(45) Date of Patent: Nov. 14, 2023

(54) LIGHT GUIDE PLATE MADE OF LEAD-FREE GLASS HAVING A HIGH REFRACTIVE INDEX AND IMAGE DISPLAY DEVICE USING A LIGHT GUIDE PLATE

(71) Applicant: HOYA CORPORATION, Tokyo (JP)

(72) Inventor: Yasuo Kogure, Toda (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 17/988,495

(22) Filed: Nov. 16, 2022

(65) Prior Publication Data

US 2023/0080496 A1 Mar. 16, 2023

Related U.S. Application Data

(63) Continuation of application No. 16/801,106, filed on Feb. 25, 2020, now Pat. No. 11,543,658, which is a
(Continued)

(30) Foreign Application Priority Data

Jul. 12, 2017 (JP) ................................. 2017-136277
Jul. 4, 2018 (JP) ................................. 2018-127421

(51) Int. Cl.
*G02B 27/01* (2006.01)
*C03C 3/066* (2006.01)
(Continued)

(52) U.S. Cl.
CPC .......... *G02B 27/0172* (2013.01); *C03C 3/064* (2013.01); *C03C 3/066* (2013.01);
(Continued)

(58) Field of Classification Search
CPC .. G02B 27/0172; G02B 6/0026; G02B 6/005; G02B 2027/0123; G02B 2027/0136;
(Continued)

(56) References Cited

U.S. PATENT DOCUMENTS 6,156,684 A 12/2000 Sato et al.
8,325,166 B2 12/2012 Akutsu et al.
(Continued)

FOREIGN PATENT DOCUMENTS

CN 103038567 A 4/2013
DE 102011082208 A1 3/2013
(Continued)

OTHER PUBLICATIONS

"Optical Lens and Glass materials for Optical Lens", Hoya Group Optics Division. Established, Nov. 1941. Akishima Plant, Nov. 1960, http://www.hoya-opticalworld.com.
(Continued)

*Primary Examiner* — Ellen E Kim
(74) *Attorney, Agent, or Firm* — Rabin & Berdo, P.C.

(57) ABSTRACT

Provided is a light guide plate for an image display device which uses lead-free glass, has excellent color reproducibility and a light weight, and may obtain a wide viewing angle. A light guide plate for an image display device, which guides image light inputted from an image display element and outputs the image light toward a user's pupil, is configured to be made of lead-free glass having a refractive index of 1.8 or more with respect to a wavelength of the image light, and to have internal transmittance of 0.6 or more with respect to a wavelength of 400 nm when a plate thickness is 10 mm.

13 Claims, 5 Drawing Sheets

Related U.S. Application Data continuation of application No. 16/508,720, filed on Jul. 11, 2019, now Pat. No. 10,613,335, which is a continuation of application No. 16/033,080, filed on Jul. 11, 2018, now Pat. No. 10,386,644.

(51) Int. Cl.
   *C03C 3/064* (2006.01)
   *F21V 8/00* (2006.01)

(52) U.S. Cl.
   CPC ........... *G02B 6/005* (2013.01); *G02B 6/0026* (2013.01); *G02B 2027/0123* (2013.01); *G02B 2027/0136* (2013.01); *G02B 2027/0174* (2013.01); *G02B 2027/0178* (2013.01)

(58) Field of Classification Search
   CPC .... G02B 2027/0174; G02B 2027/0178; C03C 3/064; C03C 3/066
   See application file for complete search history.

(56) References Cited

U.S. PATENT DOCUMENTS

| | | | |
|---|---|---|---|
| 9,011,720 B2* | 4/2015 | Aitken | C03C 3/145 |
| | | | 428/690 |
| 9,411,210 B2 | 8/2016 | Sugiyama et al. | |
| 9,738,041 B2 | 8/2017 | Tatsugi | |
| 10,108,015 B2 | 10/2018 | Komatsu et al. | |
| 2005/0088545 A1 | 4/2005 | Ito | |
| 2010/0026938 A1 | 2/2010 | Hattori et al. | |
| 2010/0136319 A1* | 6/2010 | Imai | G02B 1/113 |
| | | | 427/539 |
| 2012/0111061 A1 | 5/2012 | Ikenishi | |
| 2012/0220442 A1 | 8/2012 | Ogino et al. | |
| 2012/0302423 A1 | 11/2012 | Kinoshita et al. | |
| 2013/0063815 A1 | 3/2013 | Kubota | |
| 2013/0172168 A1 | 7/2013 | Sato | |
| 2013/0190162 A1 | 7/2013 | Sun | |
| 2013/0279007 A1 | 10/2013 | Kawai et al. | |
| 2013/0286276 A1 | 10/2013 | Kawamura et al. | |
| 2014/0140653 A1 | 5/2014 | Brown et al. | |
| 2014/0144505 A1 | 5/2014 | Matano et al. | |
| 2014/0376868 A1 | 12/2014 | Ritter et al. | |
| 2015/0097165 A1 | 4/2015 | Setz et al. | |
| 2016/0013432 A1 | 1/2016 | Raguenet | |
| 2016/0049449 A1* | 2/2016 | Kim | H10K 19/20 |
| | | | 257/432 |
| 2016/0334624 A1* | 11/2016 | Zhao | G02B 6/00 |
| 2017/0029322 A1 | 2/2017 | Galea et al. | |
| 2017/0066681 A1 | 3/2017 | Wada et al. | |
| 2017/0129802 A1 | 5/2017 | Kikkawa et al. | |
| 2017/0190609 A1* | 7/2017 | Aitken | C03C 3/14 |
| 2017/0357112 A1 | 12/2017 | Shibahara et al. | |
| 2018/0095329 A1 | 4/2018 | Shimizu | |

FOREIGN PATENT DOCUMENTS

| | | |
|---|---|---|
| EP | 3330754 A1 | 6/2018 |
| JP | H06227284 A | 8/1994 |
| JP | H1045497 A | 2/1998 |
| JP | 2003030893 A | 1/2003 |
| JP | 2006124223 A | 5/2006 |
| JP | 2007010830 A | 1/2007 |
| JP | 2007214098 A | 8/2007 |
| JP | 2010243787 A | 10/2010 |
| JP | 2013231827 A | 11/2013 |
| JP | 2013256426 A | 12/2013 |
| JP | 5703876 B2 | 4/2015 |
| JP | 2015105990 A | 6/2015 |
| JP | 2016085426 A | 5/2016 |
| JP | 2016117598 A | 6/2016 |
| JP | 2017032673 A | 2/2017 |
| JP | WO2017090645 A1 | 9/2018 |
| TW | 201819989 A | 6/2018 |
| WO | 2015125794 A1 | 8/2015 |
| WO | 2016162606 A1 | 10/2016 |
| WO | 2016190138 A1 | 12/2016 |
| WO | 2017018375 A1 | 2/2017 |
| WO | 2017038350 A1 | 3/2017 |
| WO | 2018039277 A1 | 3/2018 |

OTHER PUBLICATIONS

European Office Action dated Apr. 15, 2021.
http://www.hoya-opticalworld.com/chinese/, published on Apr. 1, 2017.
Schott North America Inc. Optical Glass Data Sheet Feb. 7, 2016 https://refractiveindex.info/download/data/2015/schottoptical-glass-collection-datasheets-july-2015-us.pdf.
Schott: "Data Sheet N-SF11 Schott Glass", XP055793504, Feb. 1, 2014.

* cited by examiner

LIGHT GUIDE PLATE MADE OF LEAD-FREE GLASS HAVING A HIGH REFRACTIVE INDEX AND IMAGE DISPLAY DEVICE USING A LIGHT GUIDE PLATE

CROSS-REFERENCE TO RELATED APPLICATIONS

This application is a continuation of U.S. application Ser. No. 16/801,106, filed on Feb. 25, 2020, which is a continuation of U.S. application Ser. No. 16/508,720, filed on Jul. 11, 2019 (issued on Apr. 7, 2020, as U.S. Pat. No. 10,613,335), which is a continuation of U.S. application Ser. No. 16/033,080, filed on Jul. 11, 2018 (issued on Aug. 20, 2019, as U.S. Pat. No. 10,386,644), which claims the benefit of Japanese Patent Applications No. 2017-136277, filed on Jul. 12, 2017, and 2018-127421, filed on Jul. 4, 2018, respectively, the contents of which are incorporated herein by reference.

TECHNICAL FIELD

The present invention relates to a light guide plate used for an image display device such as a head-mounted display, and an image display device using the same.

BACKGROUND ART

Recently, a head-mounted display has been provided for practical use as a device that enlarges a two-dimensional image by using a virtual image optical system and displays the enlarged virtual image to allow an observer to observe the enlarged virtual image.

The head-mounted displays are classified into a see-through transmissive head-mounted display and a non-transmissive head-mounted display. Because the transmissive head-mounted display is used in combination with an information terminal or used to provide augmented reality (AR), the transmissive head-mounted display needs to have a small size and excellent portability. In addition, because the non-transmissive head-mounted display is used to watch movies, or provide games, virtual reality (VR), or the like, the non-transmissive head-mounted display needs to have a wide viewing angle in which a sense of immersion is obtained.

The head-mounted display is disclosed in, for example, Patent Document 1. The head-mounted display disclosed in Patent Document 1 is provided with a display device which displays an image, a light guide member to which the image displayed on a display element is inputted, and a propagation means which totally reflects the inputted image in the light guide member to propagate the inputted image toward a user's pupils. Further, the light guide member is made of a glass material having a refractive index of about 1.7 in order to obtain a predetermined viewing angle.

DOCUMENT OF RELATED ART

Patent Document

[Patent Document 1]
Japanese Patent Application Laid-Open No. 2010-243787

SUMMARY OF INVENTION

Technical Problem

An image having a viewing angle of about 10.0 degrees may be obtained according to the light guide member of the head-mounted display disclosed in Patent Document 1, but there is a need for a light guide member that have a wider viewing angle and excellent color reproducibility for the purpose of the VR. In addition, there is a need for a light guide member that is smaller in size and lighter in weight for the purpose of the AR, and there is also a need for a thinner light guide member. In addition, recently, there is also a need for a lead-free light guide member in terms of environmental protection and effective utilization of resources.

The present invention has been made in consideration of the aforementioned situations, and an object of the present invention is to provide a light guide plate for an image display device (head-mounted display, etc.) which uses lead-free glass, has excellent color reproducibility and a light weight, and may obtain a wide viewing angle, and to provide an image display device using the light guide plate.

Solution to Problem

To achieve the aforementioned object, a light guide plate according to the present invention is a light guide plate for an image display device which guides image light inputted from an image display element and outputs the image light toward a user's pupil, in which the light guide plate is made of lead-free glass having a refractive index of 1.8 or more with respect to a wavelength of the image light, and has internal transmittance of 0.6 or more with respect to a wavelength of 400 nm when a plate thickness is 10 mm.

According to the light guide plate having the aforementioned configuration, it is possible to implement an image display device which is thin and light in weight and has excellent color reproducibility and a wide viewing angle.

In addition, the light guide plate may have a first surface and a second surface that face each other, and parallelism of the first surface and the second surface may be 20 arc seconds or less. In addition, in this case, a difference between a maximum value and a minimum value of a distance from the first surface to the second surface may be 5 μm or less.

In addition, when transmitted light of a standard light source D65 when the plate thickness is 10 mm is represented by an x-y chromaticity diagram, chromaticity of x may be 0.31 to 0.34, and chromaticity of y may be 0.33 to 0.36.

In addition, the plate thickness may be 0.5 to 1.0 mm.

In addition, the light guide plate may include a first optical element which diffracts the guided image light and outputs the image light to the user's pupil. In addition, in this case, the first optical element may be made of a material having a refractive index higher than a refractive index of air. In addition, the first optical element may be made of a material having a refractive index higher than a refractive index of the light guide plate.

In addition, the light guide plate may include a second optical element which diffracts the image light inputted from the image display element and inputs the image light to the light guide plate. In addition, in this case, the second optical element may be made of a material having a refractive index higher than a refractive index of air. In addition, the second optical element may be made of a material having a refractive index higher than a refractive index of the light guide plate.

In addition, according to another aspect, an image display device according to the present invention includes: a light source which outputs illumination light; an image display element which receives the illumination light from the light source and outputs image light; and any of the light guide plates which guides the image light inputted from the image display element and outputs the image light toward a user's pupil.

Effect of Invention

As described above, according to the present invention, it is possible to implement a light guide plate for an image display device which uses lead-free glass, has excellent color reproducibility and a light weight, and may obtain a wide viewing angle. In addition, it is possible to implement an image display device using the light guide plate.

DESCRIPTION OF EMBODIMENTS

Figures 1A, 1B:
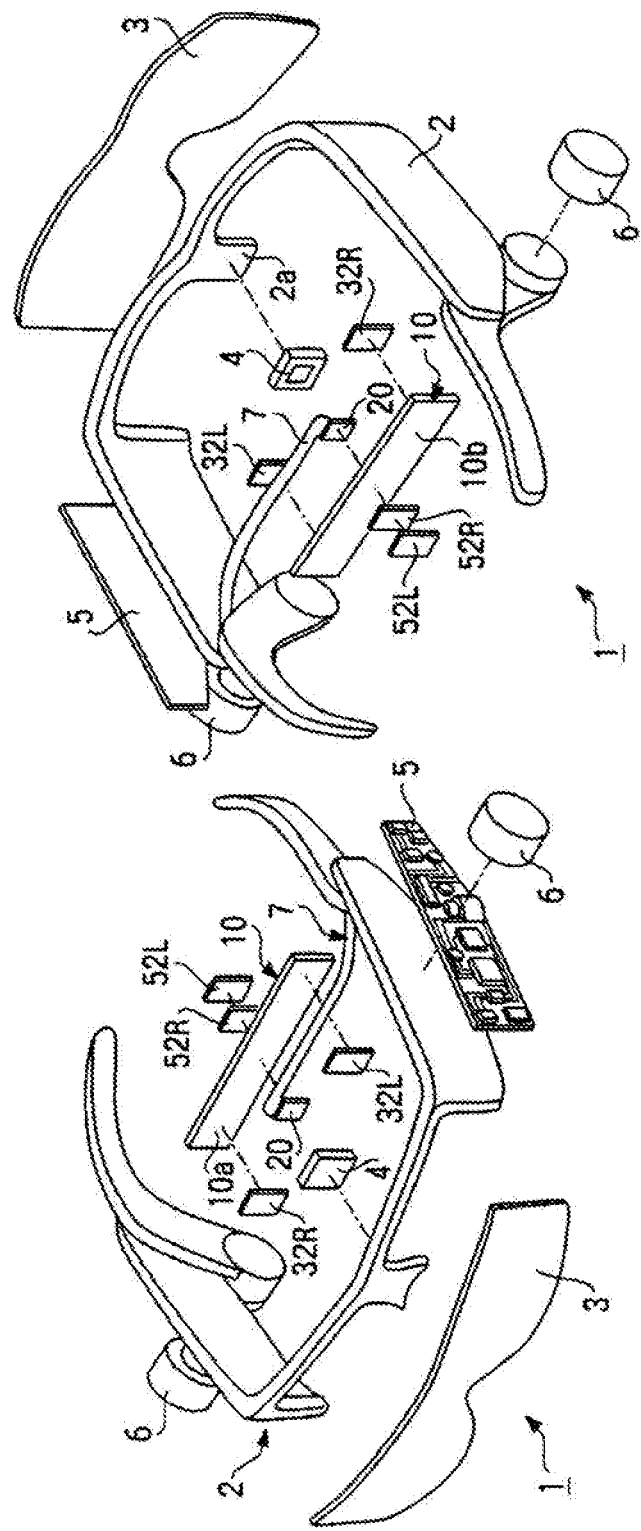
FIG. 1A and FIG. 1B are views illustrating a configuration of a head-mounted display using a light guide plate according to an exemplary embodiment of the present invention.

Hereinafter, exemplary embodiments of the present invention will be described in detail with reference to the drawings. Further, in the drawings, the same or similar constituent elements are designated by the same reference numerals, and a description of thereof will be omitted.

FIG. 1 is a view illustrating a configuration of a head-mounted display 1 (hereinafter, abbreviated to an "HMD 1") using a light guide plate 10 according to an exemplary embodiment of the present invention, in which FIG. 1A is a perspective front view, and FIG. 1B is a perspective rear view. As illustrated in FIGS. 1A and 1B, a spectacle lens 3 is mounted at a front side of a spectacle type frame 2 mounted on a user's head. A backlight 4 for illuminating an image is mounted on a mounting unit 2a of the spectacle type frame 2. A signal processing instrument 5 for projecting an image and speakers 6 for reproducing voice are provided on temple portions of the spectacle type frame 2. The light guide plate 10 is a thin-plate-shaped optical component having a rectangular shape, and a flexible printed circuit (FPC) 7, which constitutes wiring extended from a circuit of the signal processing instrument 5, is wired along the spectacle type frame 2. A display element unit (e.g., a liquid crystal display element) 20 is wired to a central position between the user's both eyes by the FPC 7, and the display element unit 20 is retained so that an approximately central portion of the display element unit 20 is disposed on an optical axis of the backlight 4. The display element unit 20 is fixed relative to the light guide plate 10 so that the display element unit 20 is positioned at the approximately central portion of the light guide plate 10. In addition, at a point positioned in front of the user's eyes, holographic optical elements (HOEs) 32R and 32L (first optical elements) are closely attached and fixed to a first surface 10a of the light guide plate 10 by adhesion or the like. HOEs 52R and 52L are stacked on a second surface 10b of the light guide plate 10 at a position opposite to the display element unit 20 based on the light guide plate 10.

Figure 2:
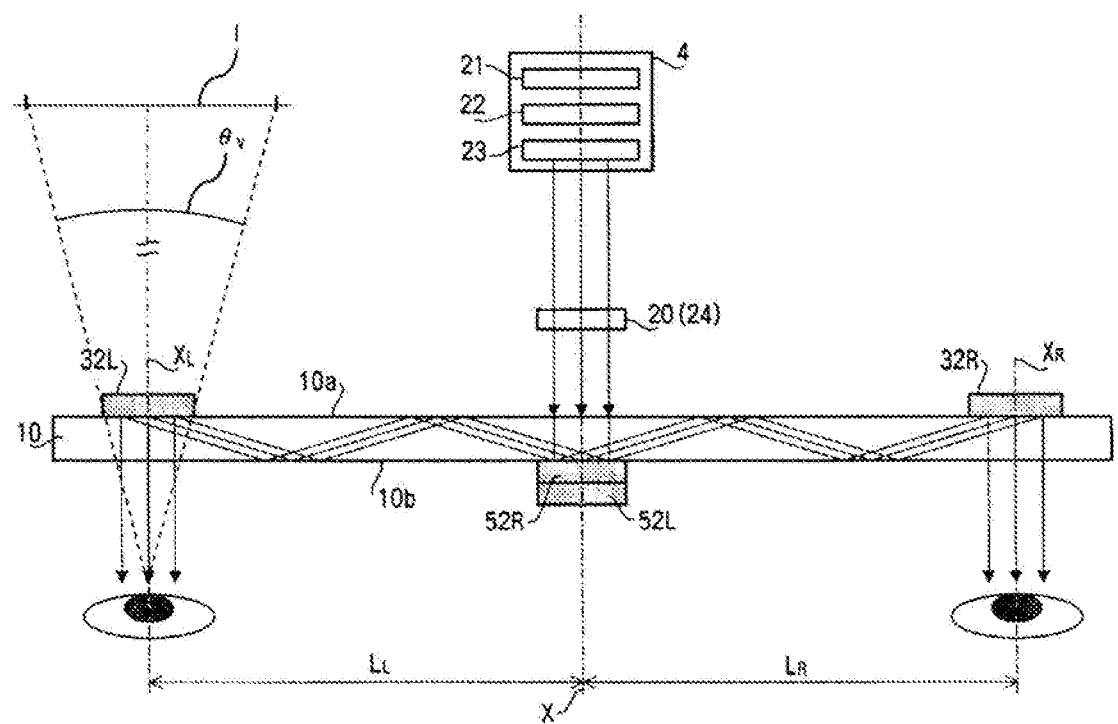
FIG. 2 is a side view schematically illustrating the configuration of the head-mounted display using the light guide plate according to the exemplary embodiment of the present invention.

FIG. 2 is a side view schematically illustrating a configuration of the HMD 1 of the present exemplary embodiment. Further, in FIG. 2, for clarity of the drawings, only main parts of the invention are illustrated, but the spectacle type frame 2 and the like are not illustrated. As illustrated in FIG. 2, the HMD 1 is structured to be symmetrical with respect to a vertical axis based on a centerline X that connects a center of an image display element 24 and a center of the light guide plate 10. In addition, a light beam, which is inputted to the light guide plate 10 from the image display element 24 and has a wavelength, is split into two light beams, and the two light beams are guided to the user's right and left eyes, respectively, as described below. Optical paths of the light beams, which are guided to the respective eyes and have wavelengths, are also approximately symmetrical with respect to the vertical axis based on the centerline X.

As illustrated in FIG. 2, the backlight 4 has a laser source 21, a diffusion optical system 22, and a micro lens array 23. The display element unit 20 is an image forming unit having the image display element 24, and the display element unit 20 is operated, for example, in a field sequential manner. The laser source 21 is a laser source that corresponds to the respective wavelengths of R (wavelength of 436 nm), G (wavelength of 546 nm), and B (wavelength of 633 nm), and the laser source 21 sequentially emits the light beams having the respective wavelengths at a high speed. The light beams having the respective wavelengths are inputted to the diffusion optical system 22 and the micro lens array 23, converted into uniform and parallel light beams having high directivity without light quantity irregularity, and perpendicularly inputted to a display panel surface of the image display element 24.

For example, the image display element 24 is a transmissive liquid crystal (LCD T-LCOS) panel operated in a field sequential manner. The image display element 24 modulates the light beams having the respective wavelengths in accordance with an image signal created by an image engine (not illustrated) of the signal processing instrument 5. The light beams having the respective wavelengths, which are modulated to pixels within an effective region of the image display element 24, are inputted to the light guide plate 10 while having predetermined light beam cross sections (having approximately the same shape as the effective region). Further, for example, the image display element 24 may be substituted with other types of display elements such as a digital mirror device (DMD) or a reflective liquid crystal (LCOS) panel, a micro electro mechanical system (MEMS), organic electro-luminescence (EL), or inorganic EL.

Further, the display element unit 20 is not limited to the display element operated in a field sequential manner, but an image forming unit of a synchronous display element (a display element having an RGB color filter with a predetermined array in front of a light output surface) may be applied. In this case, for example, a white light source may be used as the light source.

As illustrated in FIG. 2, the light beams having the respective wavelengths, which are modulated by the image display element 24, are sequentially inputted into the light guide plate 10 from the first surface 10a. The HOEs 52R and 52L (second optical elements) are stacked on the second surface 10b of the light guide plate 10. For example, each of the HOEs 52R and 52L is a reflective volume phase type HOE having a rectangular shape and has a configuration in which three photopolymers, on which interference fringes corresponding to the light beams having the respective wavelengths of R, G, and B are recorded, are stacked. That is, each of the HOEs 52R and 52L is configured to have a wavelength selecting function of diffracting the light beams of the respective wavelengths of R, G, and B and allowing light beams having the other wavelengths to penetrate therethrough.

In addition, each of the HOEs 52R and 52L may be a single-layered photopolymer on which interference fringes corresponding to the light beams having the respective wavelengths of R, G, and B are recorded.

In addition, each of the HOEs 52R and 52L is configured by two-layered photopolymers, and the wavelength selecting function corresponding to the light beams having the respective wavelengths of R, G, and B may be imparted. For example, it is conceivable that each of the HOEs 52R and 52L is configured by two-layered photopolymers including a single-layered photopolymer on which interference fringes corresponding to the light beams having the respective wavelengths of R and G are recorded, and a single-layered photopolymer on which interference fringes corresponding to the light beam having the wavelength of B are recorded. Further, the HOEs 32R and 32L are also reflective volume phase type HOEs and have the same layer structures as the HOEs 52R and 52L. For example, the HOEs 32R, 32L, 52R, and 52L may have approximately the same pitches of the interference fringe patterns.

The HOEs 52R and 52L are stacked in a state in which the centers of the HOEs 52R and 52L coincide with each other and the interference fringe patterns are reversed at 180 degrees. Further, the HOEs 52R and 52L are closely attached and fixed to the second surface 10b of the light guide plate 10 by adhesion or the like so that the centers of the HOEs 52R and 52L coincide with the centerline X in the state in which the HOEs 52R and 52L are stacked. The light beams, which are modulated by the image display element 24 and have the respective wavelengths, are sequentially inputted to the HOEs 52R and 52L through the light guide plate 10

Each of the HOEs 52R and 52L diffracts the light beams, which are sequentially inputted and have the respective wavelengths, at a predetermined angle in order to guide the light beams to the right and left eyes. The light beams, which are diffracted by the HOEs 52R and 52L and have the respective wavelengths, are repeatedly and totally reflected at an interface between the light guide plate 10 and air, propagated into the light guide plate 10, and inputted to the HOEs 32R and 32L. Here, the HOEs 52R and 52L impart the same diffraction angle to the light beams having the respective wavelengths. For this reason, all of the light beams, which have the wavelengths and are inputted to approximately the same incident position on the light guide plate 10 (or in other words, outputted from approximately the same coordinate within the effective region of the image display element 24), are propagated along approximately the same optical path in the light guide plate 10 and inputted to approximately the same position on the HOEs 32R and 32L. From another point of view, the HOEs 52R and 52L diffract the light beams having the respective wavelengths of RGB so that a positional relationship between pixels within the effective region of the image displayed within the effective region of the image display element 24 is faithfully reproduced on the HOEs 32R and 32L.

In the present exemplary embodiment as described above, the HOEs 52R and 52L diffract all of the light beams, which have the wavelengths and outputted from approximately the same coordinate within the effective region of the image display element 24, so that the light beams are inputted to approximately the same position on the HOEs 32R and 32L. Meanwhile, in another exemplary embodiment, the HOEs 52R and 52L may be configured to diffract all of the light beams, which have the wavelengths and have inherently the same pixels relatively shifted within the effective region of the image display element 24, so that the light beams are inputted to approximately the same position on the HOEs 32R and 32L.

The light beams, which are inputted onto the HOEs 32R and 32L and have the respective wavelengths, are diffracted by the HOEs 32R and 32L and sequentially outputted approximately perpendicularly to the outside from the second surface 10b of the light guide plate 10. The light beams, which are outputted as approximately parallel light beams and have the respective wavelengths as described above, form images on retinas of the user's right and left eyes as virtual images I created by the image display element 24. In addition, a condenser function may be imparted to the HOEs 32R and 32L to allow the user to observe the virtual image I as an enlarged image. That is, the light beams may be outputted at angles so as to approach the center of the pupil as much as light beams inputted to the peripheral region of the HOEs 32R and 32L, and the light beams may form images on the user's retinas. Alternatively, to allow the user to observe the virtual image I as the enlarged image, the HOEs 52R and 52L may diffract the light beams having the respective wavelengths of RGB so that the positional relationship between the pixels on the HOEs 32R and 32L has the enlarged and similar shape to the positional relationship between the pixels within the effective region of the image displayed within the effective region of the image display element 24.

In addition, as a material for forming the HOEs 32R, 32L, 52R, and 52L, a material, which has a refractive index higher than a refractive index of air, may be used. Since the HOEs 32R, 32L, 52R, and 52L are formed by using this material, it is possible to effectively improve diffraction efficiency of the HOEs 32R, 32L, 52R, and 52L. In addition, the material, which is used to form the HOEs 32R, 32L, 52R, and 52L, may have a refractive index higher than a refractive index of a material used to form the light guide plate 10. Since the HOEs 32R, 32L, 52R, and 52L are formed by using this material, it is possible to improve diffraction efficiency and effectively improve clarity of images. For example, a material including one or more of $Si_3N_4$, $TiO_2$, $Nb_2O_5$, and $Ta_2O_5$ may be used as a material used to form the HOEs 32R, 32L, 52R, and 52L.

Since the light beams having the respective wavelengths of RGB sequentially form the images on the user's retinas at a high speed as described above, the user recognizes the images created by the image display element 24 as color images. Further, an actual distance between the user's eye and the image display element 24 is just several tens of millimeters. However, since the light beams having the respective wavelengths are inputted to the eyeballs as approximately parallel light beams, the user may clearly and visually recognize the images created by the image display element 24 at the time of infinite far-sightedness. In addition, each of the HOEs 32R and 32L, which is a reflective HOE of a volume phase type, has a small half-value width of diffraction efficiency and high light transmittance of an external image. For this reason, the user may clearly observe the image of the external world together with the image displayed on the image display element 24.

Further, the present exemplary embodiment adopts a configuration in which the image display element 24 is provided in the form of a single plate without separately providing a display element for a right eye and a display element for a left eye. For this reason, an effect such as a decrease in manufacturing costs is obtained. In addition, the light beams from the common object point (i.e., the image of the image display element 24 in the form of a single plate) are guided to the user's respective eyes via the optical path lengths which are the same in the left and right sides. For this reason, a synchronized image may be inputted to the user's respective eyes.

In the configuration of the present exemplary embodiment as described above, an air converted optical path length of the light beam traveling in the light guide plate 10 becomes shorter as a refractive index is increased, and as a result, an apparent viewing angle with respect to a width of the image display element 24 is increased as the refractive index is increased. Therefore, in the present exemplary embodiment, lead-free glass, which has a high refractive index of 1.8 or more with respect to the respective wavelengths of RGB and has a plate thickness of 0.5 to 1.0 mm, is used for the light guide plate 10 in order to increase the viewing angle (i.e., so that a viewing angle θv with respect to the virtual image I of the image display element 24 is, for example, 13.5 degrees or more). Further, the light guide plate 10 may have a higher refractive index, that is, 1.95 or more.

In the case in which the lead-free glass having a high refractive index is used for the light guide plate 10, preferable composition ranges of respective components, which constitute the glass, are as follows.

$SiO_2$: 0 to 35%
$B_2O_3$: 0 to 55%
ZnO: 0 to 35%
$Y_2O_3$: 0 to 40%
$ZrO_2$: 0 to 30%
$TiO_2$: 0 to 20%

In addition, the contents of the respective components are indicated by mass % with respect to overall mass of the glass in terms of oxide conversion composition. Here, assuming that all of the oxides, the combined salts, the metal fluorides, and the like used as raw materials of the glass constituent components of the present invention are decomposed and converted into oxides while being melted, the oxide conversion composition refers to the composition which represents the respective components included in the glass under a condition in which the total mass of the corresponding produced oxides is 100 mass %.

$SiO_2$ is a component that constitutes a basic structure of the glass, and when the $SiO_2$ content is equal to or higher than 0%, the stability of the glass is improved, and viscosity suitable to form molten glass is easily maintained. If the $SiO_2$ content is higher than 35%, a refractive index is decreased and a liquid-phase temperature or a glass-transition temperature is increased, and as a result, the $SiO_2$ content is preferably 0 to 35%. In addition, the $SiO_2$ content is more preferably 1 to 25%, and much more preferably 1 to 15%.

$B_2O_3$ is a network forming oxide that imparts a low dispersion property to the glass. When the $B_2O_3$ content is equal to or higher than 0%, it is possible to improve stability and chemical durability of the glass. If the $B_2O_3$ content is higher than 55%, a refractive index is decreased, and as a result, the $B_2O_3$ content is preferably 0 to 55%. In addition, the $B_2O_3$ content is more preferably 1 to 45%, and much more preferably 1 to 40%.

ZnO is a component that maintains a high refractive index and imparts a low dispersion property. When the ZnO content is equal to or higher than 0%, it is possible to effectively decrease a melting temperature, a liquid-phase temperature, and a transition temperature of the glass. If the ZnO content is higher than 35%, the glass is easily devitrified and chemical durability thereof deteriorates, and as a result, the ZnO content is preferably 0 to 35%. In addition, the ZnO content is preferably 0.5 to 25%, and much more preferably 1 to 20%.

$Y_2O_3$ is a component that maintains a high refractive index and imparts a low dispersion property. When the $Y_2O_3$ content is equal to or higher than 0%, it is possible to improve stability and chemical durability of the glass. If the $Y_2O_3$ content is higher than 40%, the glass is easily devitrified and a glass-transition temperature or a strain point temperature is increased, and as a result, the $Y_2O_3$ content is preferably 0 to 40%. In addition, the $Y_2O_3$ content is more preferably 0 to 20%, and much more preferably 0.1 to 8%.

$ZrO_2$ is a component that adjusts an optical function and improves stability and a weather-resistant property of the glass. When the $ZrO_2$ content is equal to or higher than 0%, it is possible to improve stability of the glass. If the $ZrO_2$ content is higher than 30%, stability of the glass deteriorates and an increase in dispersion is caused, and as a result, the $ZrO_2$ content is preferably 0 to 30%. In addition, the $ZrO_2$ content is more preferably 0.5 to 15%, and much more preferably 1 to 10%.

$TiO_2$ is a component that serves as a modifier for a glass structure. When the $TiO_2$ content is equal to or higher than 0%, it is possible to improve a refractive index of the glass and improve stability of the glass. If the $TiO_2$ content is higher than 20%, there occur an increase in dispersion, deterioration in thermal stability, an increase in liquid-phase temperature, and deterioration in coloration degree, and as a result, the $TiO_2$ content is preferably 0 to 20%. In addition, the $TiO_2$ content is preferably 1 to 18%, and much more preferably 1 to 15%.

In addition, the first surface 10a and the second surface 10b of the light guide plate 10 of the present exemplary embodiment may have high parallelism in order to assuredly guide the light beams having the respective wavelengths of RGB to the HOEs 32R and 32L. Therefore, the light guide plate 10 of the present exemplary embodiment is processed so that the parallelism of the first surface 10a and the second surface 10b is 20 arc seconds or less. Further, the parallelism of the first surface 10a and the second surface 10b may be 10 arc seconds or less, particularly, 5 arc seconds or less. Further, if the parallelism of the first surface 10a and the second surface 10b is greater than 20 arc seconds, the light beams having the respective wavelengths of RGB cannot be accurately guided to the HOEs 32R and 32L.

As described above, since the lead-free glass having a high refractive index of 1.8 or more with respect to the respective wavelengths of RGB is used for the light guide plate 10 of the present exemplary embodiment, it is possible to configure the HMD 1 which is thin and light in weight and has the wide viewing angle θv (e.g., 13.5 degrees or more).

In addition, the light guide plate 10 of the present exemplary embodiment may have high transmittance with respect to the respective wavelengths of RGB in order to accurately guide the light beams having the respective wavelengths of RGB (i.e., to accurately reproduce colors). In particular, the wavelength of B is within a wavelength region of 400 to 500 nm, and the displayed image (virtual image I) entirely becomes yellow as the component of B is decreased, and as a result, the light guide plate 10 may be configured so that the component of B is not decreased. Therefore, the glass material having internal transmittance of 0.6 or higher with respect to a wavelength of 400 nm when a plate thickness is 10 mm is used for the light guide plate 10 of the present exemplary embodiment. Further, the higher internal transmittance is favorable, and the internal transmittance may be 0.65 or higher, more particularly, 0.70 or higher.

In addition, the light guide plate 10 of the present exemplary embodiment needs to accurately guide the light beams having the respective wavelengths of RGB (in a well-balanced manner) in order to faithfully reproduce the color image by using the image display element 24. In general, an x-y chromaticity coordinate in a visual field of a standard light source D65 at 10 degrees is x: 0.3138 and y: 0.3310, but if there is absorption in the light guide plate 10, a shift occurs from the coordinate, such that a color sense of the use varies. Therefore, a glass material, which has x: 0.31 to 0.34 and y: 0.33 to 0.36 when transmitted light of the standard light source D65 when the plate thickness is 10 mm is represented by the x-y chromaticity diagram (coordinate), is used for the light guide plate 10 of the present exemplary embodiment. Further, x may be 0.31 to 0.33, more particularly, 0.31 to 0.32. In addition, y may be 0.33 to 0.35, more particularly, 0.33 to 0.34. Further, if x exceeds the range of x: 0.31 to 0.34 or if y exceeds the range of y: 0.33 to 0.36, coloration of the displayed image (virtual image I) is increased, and the user observes the displayed image (virtual image I) having greatly different color senses.

In addition, the light guide plate 10 of the present exemplary embodiment may have high flatness in order to accurately guide the light beams having the respective wavelengths of RGB and obtain an image which is less blurred. Therefore, the light guide plate 10 of the present exemplary embodiment is polished so that a difference (i.e., a total thickness variation (TTV)) between a maximum value and a minimum value of a thickness of the light guide plate 10 (i.e., a distance between the first surface 10a and the second surface 10b) is 5 μm or less. Further, the flatness (i.e., TTV) may be 2 μm or less, more particularly, 1 μm or less. Further, if the TTV exceeds 5 μm, the displayed image (virtual image I) observed by the user is very blurry.

EXAMPLES

Next, specific Examples of the light guide plate 10 will be described. Further, the light guide plate 10 of the present invention is not limited to the present Examples.

Example 1

"TAFD55", a product manufactured by HOYA Corporation, was used as a glass material, and the light guide plate 10 was obtained by processing the glass material so that the light guide plate 10 has length 50 mm×width 20 mm×thickness 1.0 mm. Main properties thereof are as follows.

Refractive index (@436 nm): 2.04600

Refractive index (@546 nm): 2.00912

Refractive index (@633 nm): 1.99406

Parallelism of the first surface 10a and the second surface 10b: 15 arc seconds

Flatness (TTV): 5 μm

Internal transmittance with respect to a wavelength of 400 nm when a plate thickness is 10 mm: 0.749

Chromaticity of transmitted light of the standard light source D65 when a plate thickness is 10 mm: x=0.3187, y=0.3385

In addition, the composition of the "TAFD55" is as follows.

$SiO_2$: 1 to 10%

$B_2O_3$: 1 to 10%

ZnO: 0 to 10%

$Y_2O_3$: 0 to 1%

$ZrO_2$: 1 to 10%

Figure 3A:
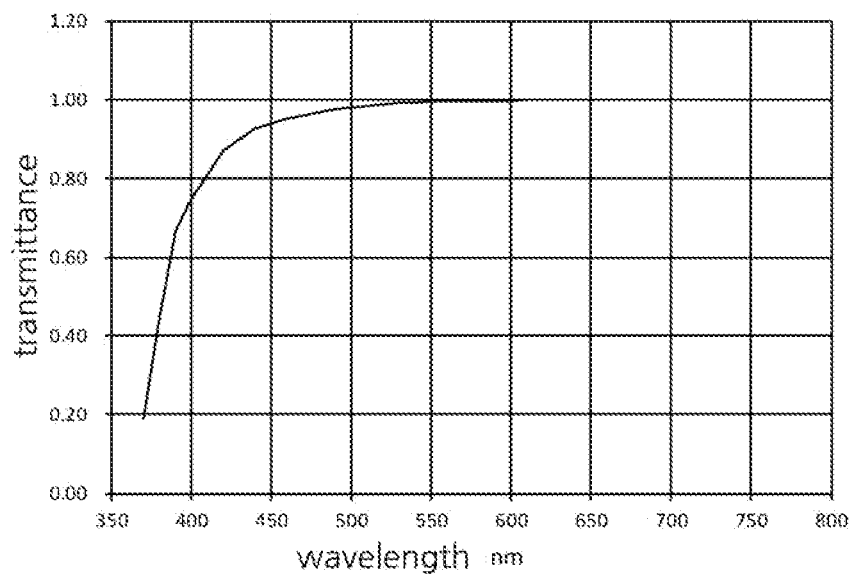
FIG. 3A and FIG. 3B are graphs illustrating a characteristic of a light guide plate according to Example 1 of the present invention.
Figure 3B:
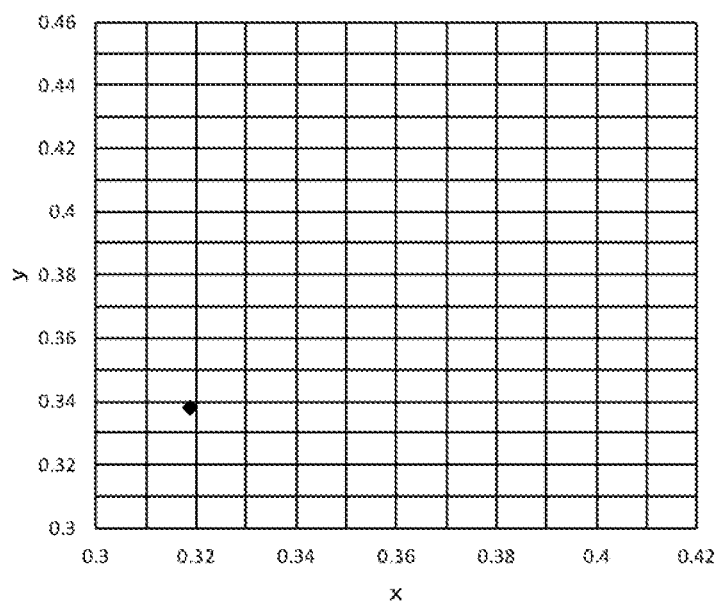

In addition, FIG. 3 is a graph illustrating the properties of the present Example, in which FIG. 3A illustrates spectral characteristics when the plate thickness is 10 mm, and FIG. 3B is a chromaticity diagram of the transmitted light of the standard light source D65 when the plate thickness is 10 mm.

As a result of embedding the light guide plate 10 obtained as described above in the HMD 1, and then evaluating an image at a position of an eye point, an image having a wide viewing angle, high brightness, and high contrast could be observed.

Table 1 is a table illustrating the respective parameters and results thereof (i.e., viewing angle θv) at the time of simulating the viewing angle when the light guide plate 10 of the present Example was embedded in the HMD 1. In addition, FIG. 4 is a view illustrating a simulation model, and the respective parameters illustrated in FIG. 4 correspond to the parameters in Table 1.

TABLE 1

| | |
|---|---|
| Diffraction angle of the HOEs 52R and 52L: $θ'_D$ | 85.0 |
| Thickness of the light guide plate 10: t | 1.0 |
| Number of times of reflection in the light guide plate 10 | 15 |
| Width of the HOEs 52R and 52L | 5.2 |
| Refractive index of the HOEs 52R, 52L, 32R, and 32L | 1.80 |
| Refractive index of the light guide plate 10 | 2.04600 |
| Angle of light beam in the light guide plate 10: $θ'i$ | 61.2 |
| Shift amount per one reflection: $t/\tan θ'i$ | 1.8 |
| L (= $t/\tan θ'i$ × (number of times of reflection + 1)) | 27.3 |
| Optical path length per one reflection: $t/\cos θ'i$ | 2.1 |
| Actual optical path length (= $t/\cos θ'i$ × (number of times of reflection + 1)) | 31.1 |
| Air converted optical path length | 15.2 |
| Additional optical path length (distance to a pupil from the HOEs 32R and 32L) | 5.0 |
| Viewing angle θv | 14.7 |

Figure 4A:
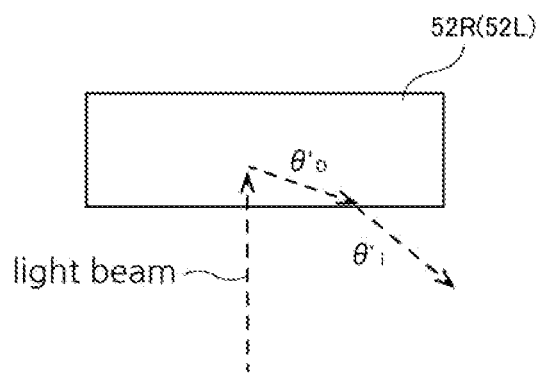
FIG. 4A, FIG. 4B, and FIG. 4C are views illustrating a simulation model of a head-mounted display using the light guide plate according to Example 1 of the present invention.
Figure 4B:
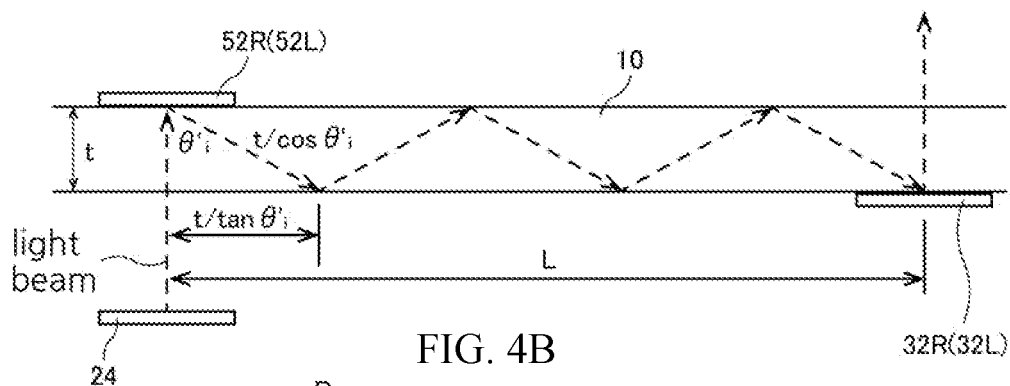
Figure 4C:
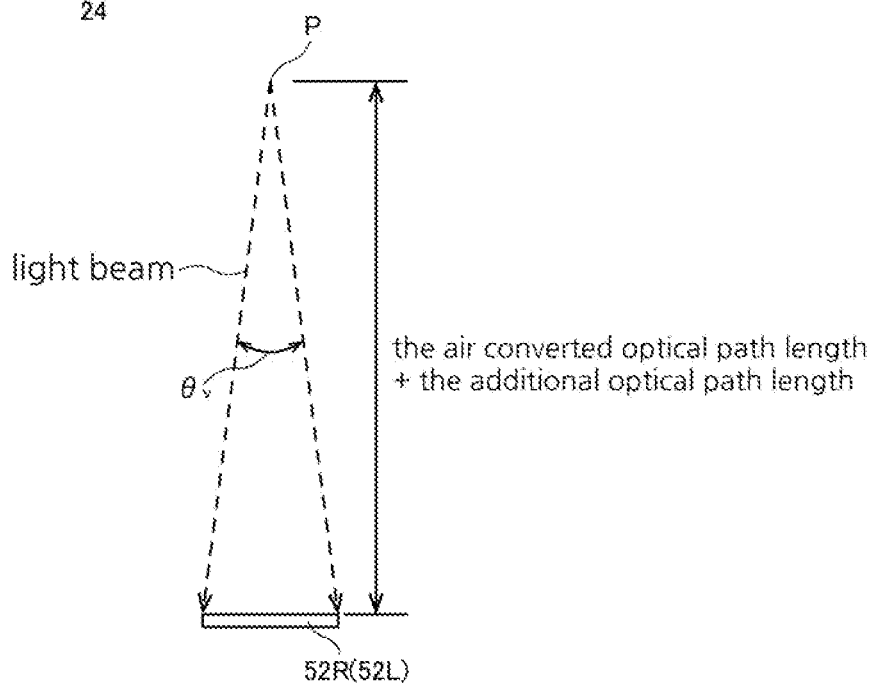

As illustrated in FIG. 4, in the present simulation model, the light beams having the respective wavelengths of RGB (broken lines in FIG. 4) are inputted to the HOEs 52R and 52L, diffracted at a diffraction angle θ'D (85.0°) in the HOEs 52R and 52L, and inputted to the light guide plate 10 at a light beam angle θ'i (61.2° (FIG. 4A). Further, the light beams, which are inputted to the light guide plate 10 and have the respective wavelengths of RGB, are reflected a predetermined number of time (15 times) in the light guide plate 10 (thickness: t=1.0 mm, refractive index: 2.04600), and outputted toward the user's pupils (FIG. 4B). Further, the viewing angle θv in this case is determined by a positional relationship between a pupil position P and the HOEs 52R and 52L, and as illustrated in FIG. 4C, the viewing angle θv may be indicated by an angle formed between the pupil position P and both ends of the HOEs 52R and 52L which are disposed at positions spaced apart from each other by the air converted optical path length+the additional optical path length from the pupil position P (distance to the pupil from the HOEs 32R and 32L). Further, the viewing angle θv of the HMD 1 embedded with the light guide plate 10 of the present Example was 14.7 degrees when calculating the viewing angle θv by using the respective parameters in Table 1 (see Table 1). As described above, it can be seen that a wider viewing angle is obtained according to the light guide plate 10 of the present Example in comparison with the HMD having a configuration in the related art.

Example 2

"TAFD65", a product manufactured by HOYA Corporation, was used as a glass material, and the light guide plate 10 was obtained by processing the glass material so that the light guide plate 10 has length 50 mm×width 20 mm×thickness 1.0 mm. Main properties thereof are as follows.

Refractive index (@436 nm): 2.10226
Refractive index (@546 nm): 2.06011
Refractive index (@633 nm): 2.04305
Parallelism of the first surface 10a and the second surface 10b: 15 arc seconds
Flatness (TTV): 5 μm
Internal transmittance with respect to a wavelength of 400 nm when a plate thickness is 10 mm: 0.609
Chromaticity of transmitted light of the standard light source D65 when a plate thickness is 10 mm: x=0.3227, y=0.3440

In addition, the composition of the "TAFD65" is as follows.

$SiO_2$: 1 to 10%
$B_2O_3$: 1 to 10%
ZnO: 0 to 1%
$Y_2O_3$: 0 to 1%
$ZrO_2$: 1 to 10%
$TiO_2$: 10 to 20%

Figure 5A:
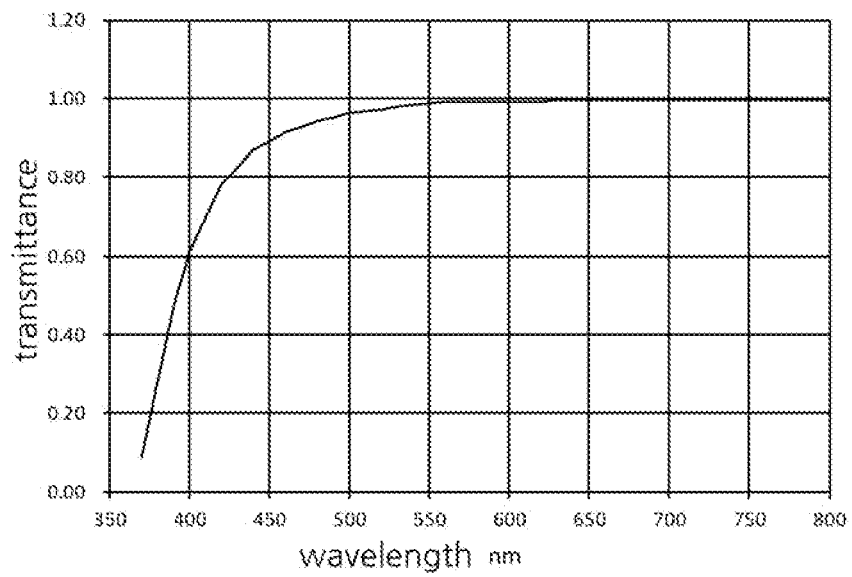
FIG. 5A and FIG. 5B are graphs illustrating a characteristic of a light guide plate according to Example 2 of the present invention.
Figure 5B:
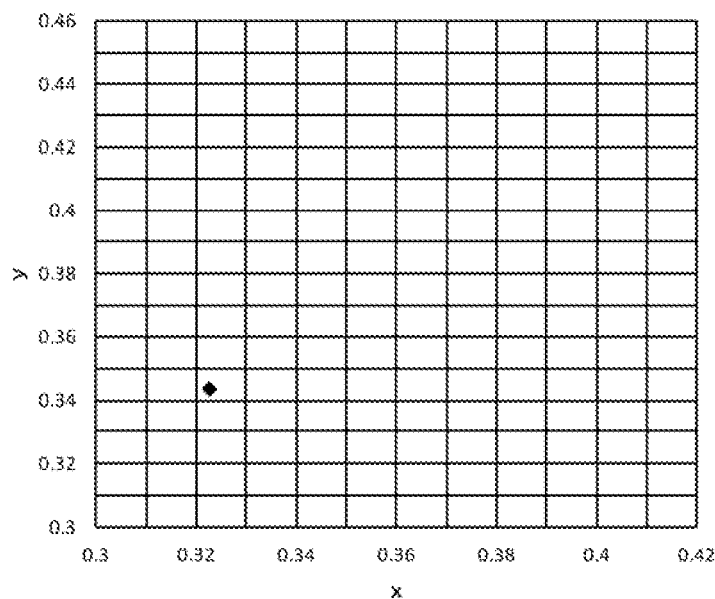

In addition, FIG. 5 is a graph illustrating the properties of the present Example, in which FIG. 5A illustrates spectral characteristics when the plate thickness is 10 mm, and FIG. 5B is a chromaticity diagram of the transmitted light of the standard light source D65 when the plate thickness is 10 mm.

As a result of embedding the light guide plate 10 obtained as described above in the HMD 1, and then evaluating an image at a position of an eye point, an image having a wide viewing angle, high brightness, and high contrast could be observed.

Table 2 is a table illustrating the respective parameters and results thereof (i.e., viewing angle θv) at the time of simulating the viewing angle when the light guide plate 10 of the present Example was embedded in the HMD 1. Further, a simulation model is identical to that illustrated in FIG. 4.

TABLE 2

| | |
|---|---|
| Diffraction angle of the HOEs 52R and 52L: $\theta'_D$ | 85.0 |
| Thickness of the light guide plate 10: t | 1.0 |
| Number of times of reflection in the light guide plate 10 | 15 |
| Width of the HOEs 52R and 52L | 5.2 |
| Refractive index of the HOEs 52R, 52L, 32R, and 32L | 1.80 |
| Refractive index of the light guide plate 10 | 2.10226 |
| Angle of light beam in the light guide plate 10: $\theta'i$ | 58.5 |
| Shift amount per one reflection: $t/\tan\theta'i$ | 1.6 |
| L (= $t/\tan\theta'i$ × (number of times of reflection + 1)) | 24.5 |
| Optical path length per one reflection: $t/\cos\theta'i$ | 1.9 |
| Actual optical path length (= $t/\cos\theta'i$ × (number of times of reflection + 1)) | 28.7 |
| Air converted optical path length | 13.7 |
| Additional optical path length (distance to a pupil from the HOEs 32R and 32L) | 5.0 |
| Viewing angle θv | 15.9 |

Similar to the simulation in Table 1, the viewing angle θv of the HMD 1 embedded with the light guide plate 10 of the present Example was 15.9 degrees when performing the simulation by using the respective parameters in Table 2. As described above, it can be seen that a wider viewing angle is obtained according to the light guide plate 10 of the present Example in comparison with the HMD having a configuration in the related art.

The exemplary embodiments of the present invention have been described above. The present invention is not limited to the configurations of the respective exemplary embodiments and the specific numerical values, but may be variously modified within the scope of the technical spirit of the present invention.

The HOEs 32R, 32L, 52R, and 52L are, for example, transmissive HOEs. In this case, for example, the HOEs 52R and 52L are closely attached and fixed to the first surface 10a of the light guide plate 10 that faces the display element unit 20 in the state in which the HOEs 52R and 52L are stacked on the first surface 10a, and the HOEs 52R and 52L diffract the light beams having the respective wavelengths from the display element unit 20 so that the light beams are totally reflected in the light guide plate 10 and propagated to the HOE 32R or the HOE 32L. For example, the HOEs 32R and 32L are closely attached and fixed to the second surface 10b of the light guide plate 10 that faces the user's pupil, and diffract the light beams, which are propagated in the light guide plate 10 and have the respective wavelengths, toward the user's pupil.

In addition, the HOEs 32R, 32L, 52R, and 52L in the exemplary embodiment are described as being made of photopolymers, but the present invention is not limited to this configuration, and for example, the HOEs 32R, 32L, 52R, and 52L may be formed by depositing optical thin films onto the surface of the light guide plate 10.

In addition, for example, the laser source 21 of the display element unit 20 may be an LED or an LD (semiconductor laser) backlight that sequentially emits the light beams having the respective wavelengths of R, G, and B at a high speed.

In addition, the configuration in which the display element unit 20 is disposed at the side of the first surface 10a of the light guide plate 10 and the HOEs 52R and 52L are disposed at the side of the second surface 10b of the light guide plate 10 has been described in the present exemplary embodiment, but the present invention is not limited thereto, and for example, the display element unit 20 may be disposed at the side of the second surface 10b of the light guide plate 10, and the HOEs 52R and 52L may be disposed at the side of the first surface 10a of the light guide plate 10.

DESCRIPTION OF REFERENCE NUMERALS

1: HMD
2: spectacle type frame
2a: mounting unit
3: spectacle lens
4: backlight
5: signal processing instrument
6: speaker
7: FPC
10: light guide plate
10a: first surface
10b: second surface
20: display element unit
21: laser source
22: diffusion optical system
23: micro lens array
24: image display element
32R, 32L, 52R, 52L: HOE

The invention claimed is:

1. A light guide plate for an image display device which guides image light inputted from an image display element and outputs the image light toward a user's pupil, wherein,
the light guide plate is made of a lead-free glass having a refractive index of 1.8 or more with respect to a wavelength of the image light,
the light guide plate has an internal transmittance of 0.6 or more with respect to a wavelength of 400 nm when a plate thickness is 10 mm, and
wherein when transmitted light of a standard light source D65 when the plate thickness is 10 mm is represented by an x-y chromaticity diagram, chromaticity of x is 0.31 to 0.34, and chromaticity of y is 0.33 to 0.36.

2. The light guide plate of claim 1, wherein the light guide plate has a first surface and a second surface that face each other, and parallelism of the first surface and the second surface is 20 arc seconds or less.

3. The light guide plate of claim 2, wherein a difference between a maximum value and a minimum value of a distance from the first surface to the second surface is 5 μm or less.

4. The light guide plate of claim 1, wherein the plate thickness is 0.5 to 1.0 mm.

5. An image display device comprising:
a light source which outputs illumination light;
an image display element which receives the illumination light from the light source and outputs image light; and
the light guide plate according to claim 1 which guides the image light inputted from the image display element and outputs the image light toward a user's pupil.

6. The light guide plate of claim 1, comprising:
a first optical element which diffracts the guided image light and outputs the image light toward the user's pupil.

7. The light guide plate of claim 6, wherein the first optical element is made of a material having a refractive index higher than a refractive index of the light guide plate.

8. The light guide plate of claim 6, comprising:
a second optical element which diffracts the image light inputted from the image display element and inputs the image light to the light guide plate.

9. The light guide plate of claim 8, wherein the second optical element is made of a material having a refractive index higher than a refractive index of air.

10. The light guide plate of claim 8, wherein the second optical element is made of a material having a refractive index higher than a refractive index of the light guide plate.

11. An image display device comprising:
a light source which outputs illumination light;
an image display element which receives the illumination light from the light source and outputs image light; and
the light guide plate according to claim 2 which guides the image light inputted from the image display element and outputs the image light toward a user's pupil.

12. An image display device comprising:
a light source which outputs illumination light;
an image display element which receives the illumination light from the light source and outputs image light; and
the light guide plate according to claim 3 which guides the image light inputted from the image display element and outputs the image light toward a user's pupil.

13. An image display device comprising:
a light source which outputs illumination light;
an image display element which receives the illumination light from the light source and outputs image light; and
the light guide plate according to claim 4 which guides the image light inputted from the image display element and outputs the image light toward a user's pupil.

* * * * *